United States Patent Office 3,480,495
Patented Nov. 25, 1969

3,480,495
PROCESS FOR CEMENTING ION-EXCHANGE MATERIAL
Bernard I. Sohn, Brookline, John L. Eisenmann, Hingham, and Samuel S. Alexander, Boxboro, Mass., assignors to Ionics, Incorporated, Watertown, Mass.
No Drawing. Filed July 11, 1966, Ser. No. 563,969
Int. Cl. B32b 35/00
U.S. Cl. 156—94                                          9 Claims

ABSTRACT OF THE DISCLOSURE

This invention provides a method of filling and repairing holes or ruptures occurring in ion-exchange membranes to make them reusable and also to a process of fabricating bags, boxes etc. by cementing together sheets of ion-exchange material employing an adhesive which will polymerize to form a firm, leak-proof bond.

---

This invention relates to the securing together of membrane material. In particular, this invention relates to an effective and novel process for cementing two or more ion-exchange membrane materials in such a manner as to result in a firm bonding of the same to each other in both non-aqueous and aqueous environments. More specifically, it relates to the epoxy glueing together of two or more pieces of ion-exchange membranes in a non-aqueous environment to form a firm bond between said membrane materials when returned to an aqueous environment.

Ion-exchange sheets, homogeneous and heterogeneous, in the form of membranes have many known commercial uses in, for example, electrodialysis treatment of aqueous salt solutions, fuel cell electrolytes, as well as barriers in the form of diaphragms in battery separators, membrane permeation, etc. Such ion-exchange membranes are well known and include both membranes wherein ion-exchange groups are distributed throughout the polymeric matrix of such synthetic membranes, as well as those wherein such groups are associated only with the outer surface of such membrane. As examples only, the ion-exchange polymers may include material to which a group such as —$SO_3H$ or —OH is added to a polystyrene resin by conventional sulfonation or hydroxylation of suitable polymeric materials. In the alternative, the groups may be added by contacting the surface to be coated with a dye, the molecular structure of which leaves exposed on the surface thereof ion-exchange groups of the same type as those found upon the surfaces of cation and anion-exchange membranes, e.g. —$SO_3H$, —OH, —COOH, quaternary ammonium radicals, etc.

The best known of the ion-exchange membranes are the ion-exchange resin membranes which may be prepared by copolymerizing a mixture of ingredients, one of which contains an ionogenic substituent. In the case of cationic-exchange resins, these groups are acidic groups, such as the sulfonic acid group, the carboxylic acid group, and the like. In the case of anion-exchange resins, the group is basic in nature and may comprise amine groups, ordinary ammonium groups, the guanidine group, the dicyandiamine group and other nitrogen-containing basic groups. In the case of these anion-exchange resins, the ionizable group is attached to a polymeric compound such as phenol-formaldehyde resin, a polystyrene divinyl-benzene copolymer, a urea-formaldehyde resin, a melamine-formaldehyde resin, a polyalkylene-polyamine-formaldehyde resin, etc. Thus, typical cation resins may be prepared by copolymerizing a n-phenol sulfonic acid with formaldehyde. A typical anion resin may be prepared by copolymerizing a mixture of phenol, formaldehyde and triethylene-tetramine. The preparation and properties of a number of different types of cation-exchange resins are described throughout the literature and in particular in "Ion Exchange," Nachod, Academic Press, Inc., New York (1950); "Ion Exchange Resins," Kunin & Myers, John Wiley & Sons, Inc., New York (1950); "Styrene, Its Polymers and Copolymers and Derivatives," Boundy Boyer, Reinhold, New York (1950) and in various U.S. Patents, e.g. Juda et al., Re. 24,865; J. T. Clarke, 2,730,768, and many others.

The formation of these ion-exchange resins into membrane or sheet form is well known in the art. In general, these membranes are of two forms, the mosaic in which granules of ion-exchange resin are incorporated into a sheet-like matrix of a suitable binder, such as a binder of polyethylene or polyvinyl chloride, and the continuous ion-exchange resin membrane in which the entire membrane structure has ion-exchange characteristics. The latter type of membrane may be formed by molding or casting a partially polymerized ion-exchange resin into sheet form.

In the preparation and use of synthetic polymeric ion-exchange membranes, it is often found that pin holes, ruptures of all kinds such as tearing, electrolytic burning, and many other forms of abrasions, corrosions, etc. occur which void the use of the same as effective barriers between anolytes and catholytes, anode and cathode electrodes, etc., diaphragms in electrolytic systems such as batteries, fuel cells, electrodialysis systems, electrolytic metal depositions, electrochemical conversion cells, etc. In virtually all such defective membrane developments, it was found necessary to completely discard the defective membranes with replacement of new liquid-tight, liquid-impermeable but ion-permeable membranes. This is a costly matter since the manufacture of ion-exchange membranes is comparatively very expensive as compared to other elements of the cell in which they are employed. Up to the present time, no known method of repairing, remaking, reshaping or reuse of such defective membranes has proved satisfactory.

It has now been discovered that highly effective and useful means of repairing for reuse of defective membrane material, or reforming of sheets of ion-exchange membranes into various forms, shapes and sizes for various and sundry purposes could be made in a very simple and effective manner. Accordingly, one object of the present invention is to repair tears, holes, abrasions, etc. of ion-exchange membranes of comparatively small dimensions by proper filling of said openings with an inert material which does not otherwise deleteriously affect the usual and successful use of said punctured ion-exchange membranes.

Another object of this invention is to reshape ordinary sheet form ion-exchange membranes into any desired form and shape, such as a bag or a cylinder, into which an electrode of an electrolytic cell may be placed for prevention of the mixing of the anolyte and catholyte thereof, thus controlling the concentrations of the same.

Another object of this invention is to shape ion-exchange membranes into a three-sided enclosure into which electrodes of a cell may be inserted to prevent the deleterious effects of the phenomenon of dendrites, commonly found in storage batteries.

Still another object of this invention is to glue sections of ion-exchange membranes together so that, upon polymerization of the components of said glue, a firm bonding area is obtained which will not disintegrate with subsequent use in an aqueous environment.

Another object of this invention is to bond two or more sheets of ion-exchange membranes to enlarge the size or reshape the form of said membrane sheet.

Still another object of this invention is to employ an epoxy glue to bond surfaces of ion-exchange membrane materials together for further use.

Other objects will become apparent and the invention will be understood more fully from a consideration of the following detailed description.

There are many types of ion-exchange membrane materials in sheet form which are employed as liquid barriers but ion-permeable in aqueous mediums, such as liquid electrolytes. In many other instances, the ion-exchange membrane material is the electrolyte medium itself. But in all such cases, the ion-exchange membrane is substantially liquid impermeable but ion-permeable of either one charge or the other and in some cases amphoteric (ion permeable to both charges). These ion-exchange membranes to be effective for the designed purposes must be substantially hydraulically tight, e.g. be free from pin holes, abrasions, holes from electric heat burning, or rupture by any other means since their use as a liquid barrier is thereby vitiated. It is also appreciated that ion-exchange membrane materials, especially those of the type disclosed in the Juda et al. and John Clarke patents hereinbefore referred to, are especially subject to the present invention but it is to be understood that all types of ion-exchange membranes, including the polyethylene film type with styrene and a small amount of divinyl benzene applied thereto, polymerized and reacted with ion-exchange groups as indicated hereinabove which have at least 5% aqueous medium in the pores of said membrane are also applicable in the present invention. Thus, in accordance with the instant process, it is found necessary to first remove the effects of the water solvent in the membrane before applying cementing material to the membrane and yet prevent the usual and expected cracking or spalling of completely dried membranes. It was found that the water content of the membrane could be substantially removed from the pores of the ion-exchange membrane and replaced with a non-aqueous medium in which state a water insoluble glue or bonding material such as an epoxy glue could be applied in the presence of said non-aqueous medium, which glue upon standing for a period of time polymerizes, preferably at a slightly elevated temperature, to a hard bonding cement. The non-aqueous, glass of organic water miscible liquids, such as the glycols but aqueous compatible replacing liquids may be of the (including polyglycols) or trihydric alcohols such as glycerol, etc. Such specific organic equilibrating agents are propylene glycol, the polyethylene glycols and the like. These liquids are generally termed high-boiling, low vapor pressure liquids which will replace the water content in the membrane pores and subsequent to the glueing step will itself be replaced by soaking (equilibrating) said membrane in water. In order for the membrane to be successfully glued, it must normally be handled in air which can cause cracking of the membrane and spalling of the resin. To prevent this and yet allow glueing, the membrane is equilibrated with the high-boiling, low vapor pressure liquid which replaces the water in the membrane pores as described above. The following table lists many of the non-aqueous but aqueous compatible equilibrating agents effective for the purpose of the present invention.

PHYSICAL PROPERTIES OF THE GYLCOLS

| Name: | Solubility at 20° C., wt. percent in water |
|---|---|
| Propylene glycol | Complete |
| Trimethylene glycol | Complete |
| 1,3-butanediol | Complete |
| 1,5-pentanediol | Complete |
| 2,5-hexanediol | Complete |
| Diethylene glycol | Complete |
| Dipropylene glycol | Complete |

The replacement of the aqueous medium of the ion-exchange membrane can be effected by equilibrating the same in the organic liquid for a period of time such as overnight, and preferably the organic liquid should be substantially pure, e.g. lacking any water content. The equilibrating step may also be effected in several separate aliquot portions of said organic liquid to better effect the removal of the aqueous liquid content of the membrane with the organic liquid. The application of the water insoluble epoxy glue to the membrane surface can now be effected after which the glue is allowed to stand for an interval of time of at least an hour for glue polymerization to a firm bonding state. Maintaining an elevating temperature of about 50° C. would also hasten the polymerization of the epoxy-type glue components. The bonded membrane may then be re-equilibrated with an aqueous liquid, such as water, to reinstate the aqueous component in the pores of the ion-exchange membrane.

A non-aqueous liquid or solvent component for equilibration would include, for example, glycerine and it is apparent that equilibration therewith may be efficiently obtained by using such substantially pure organic liquids which are water compatible and which may be efficiently effected by several stages of soaking of the membrane therein. The reconstitution of the aqueous content of the membrane may be similarly obtained by using a substantially pure water liquid in several sequential stages.

The glues effective for the bonding of the ion-exchange resinous membranes are water insoluble and involve insoluble characteristics when cured (polymerized). The commercially available epoxy resin type glues are ideally suited and are principally based upon bisphenol A, which is a condensation product of acetone and phenol. For example, when epichlorohydrin and bisphenol A are reacted in the presence of an alkaline catalyst, the simplest epoxy resin or monomer product is the diglycidyl ether of bisphenol A. It is apparent that glueing systems of this type are necessarily two-component systems. Accordingly, epoxy resins require the addition of a curing agent or hardener in order to convert them to a thermoset material. A great variety of chemical reagents can be used as hardeners or curing agents; the latter may take place either by a coupling or addition process or by a catalytic polymerization such as (1) an amine type (tertiary amines) (2) acid-type (3) aldehyde condensation products: phenol-, urea-, and melamine-formaldehyde resins. The dihydric phenols such as resorcinol and hydroquinine may be effectively used. The polymer of the epoxy resins may be either acid or base catalyzed wherein it will be apparent that anions or cations will act as catalysts to assist the polymerization of an epoxy glue.

Some applications of the present invention may be directed to the repairing of pin holes, tears, punctures, etc. which occur either in the production of said membranes or in its handling or use. Such repairs may be made by filling and covering the imperfections with epoxy cement or in the alternative, in the case where the imperfections are relatively large, by patching with small flat sections of a membrane material bonded over the imperfection. Another application is the cementing of two or three flat pieces of membranes leaving an opening at the top thereof to form a bag-like enclosure for insertion of an electrode to be used as a separator in a battery or other electrolytic cell wherein the phenomena of dendrites, contamination by deleterious electrode products, concentrations of anolytes or catholytes, etc. are controlled. A cylindrical bag-like enclosure for an electrode can also be made by cementing a curved or circular membrane with or without a flat base section of a second fitted and glued piece of the membrane. An electrolyte solution may be present inside the bag forming the anolyte and/or catholyte, or the electrode may be in physical contact with the ion-exchange membrane bag throughout the active surface of said electrode. Many other useful applications of

Example 1

Two 9″ x 10″ flat pieces of cation membrane having a water content of about 40% by weight were soaked in 100% glycerol for 24 hours at room temperature. The membranes were removed and the excess glycerol was allowed to drain off the surfaces of the membrane which were then wiped dry in such a manner as not to bend or crack the same. When dry to the touch, the membranes were cemented together along three edges of the same using a commercially available epoxy cement which is a standard two-part epoxy system. When the epoxy cement was cured (polymerized) after 24 hours, the membrane which formed a bag was soaked (equilibrated) in water for a period of about an hour which replaced the glycerol and caused the memberane material to revert to the aqueous form. The epoxy cement formed a firm bond at the two sides and bottom edges of the bag for a prolonged period of time when submerged in an aqueous medium.

Example 2

The same reagents as in Example 1 were used but heat (50° C.) was applied to accelerate the conversion of the aqueous to non-aqueous system and the curing of the epoxy cement.

Example 3

Instead of glycerol as in Example 1, propylene glycol was used as the water removing agent.

Example 4

Instead of glycerol as in Example 1, trimethylene glycol was used as the water removing agent from the membrane.

Example 5

An 8″ x 20″ sheet of anion membrane was soaked overnight in 100% diethyl carbitol. The membrane was surface-dried in the manner indicated in Example 1. The dried membrane was curled around a 2″ pipe to produce a lap-joint seam of about ⅜″. The seam was then filled with a commercially available two-system epoxy cement. A Teflon coated metal bar was then clamped lengthwise along the seam exerting a pressure on the same. The epoxy cement was allowed 24 hours to set after which time the metal bar was removed and the membrane tube released easily from the pipe. The cylindrical shaped membrane was then equilibrated in water, after which the seam remained firm for an extended period of time.

Example 6

The cemented ion-exchange bag as prepared in Example 1 was placed in the anolyte of an eletcrolytic battery system and the anode of said battery was inserted in the bag. After several hours' operation of the battery, the phenomenon of dendrite formation was not apparent.

Example 7

A sheet of cation membrane was deliberately punctured, cut and abraded in separate identified areas. This caused the membranes to leak profusely when subjected to a standard water-leak test procedure. This membrane was then soaked in glycerol as indicated in Example 1. The pin holes, tears and abrasions were patched with an epoxy cement and then allowed to set in similar manner as indicated in Example 1. After equilibration of the membrane in water, the membrane proved to be leak-proof.

What is claimed is:

1. A method of repairing synthetic polymerized ion-exchange membrane resin materials, wherein there are small openings or ruptures, comprising equilibrating said membrane materials in a non-aqueous but aqueous compatible liquid until substantially all the non-polymerizable aqueous solvent in said membrane materials is replaced by non-aqueous liquid, placing an amount of epoxy resin into said opening, polymerizing said resin so that a firm bond is effected between the resin and the ion-exchange material, and then equilibrating the bonded ion-exchange materials with an aqueous liquid, thus replacing the latter aqueous liquid back into said ion-exchange membrane material for use as an ion-exchange membrane in an aqueous medium.

2. The method of cementing synthetic polymerized ion-exchange membrane resin materials comprising equilibrating said membrane materials in a non-aqueous but aqueous compatible liquid until substantially all the non-polymerizable aqueous solvent in said membrane materials is replaced by non-aqueous liquid, applying, to the surfaces to be bonded, a layer of epoxy resin, which polymerizes upon standing, so that firm bond is effected, and then equilibrating the bonded ion-exchange materials with an aqueous liquid, thus replacing the latter aqueous liquid back into said ion-exchange membrane material for use as an ion-exchange membrane in an aqueous medium.

3. The method of claim 2 wherein a large imperfection in ion-exchange materials is repaired by epoxy-cementing a patch of ion-exchange material over said imperfection.

4. The method of claim 2 wherein at least two pieces of ion-exchange membrane material are bonded together.

5. The method of claim 3 wherein the bonded ion-exchange material is formed into a bag open at one end.

6. The method of claim 4 wherein the bag is cylindrical in shape.

7. The method of claim 6 wherein the bag is rectangular in shape.

8. The method of claim 2 wherein the non-aqueous liquid is glycerol and the glue is a two-system epoxy resin.

9. The method of claim 2 wherein equilibrations and the glue polymerization were effected at an elevated temperature of about 50° C.

References Cited

UNITED STATES PATENTS

| | | | |
|---|---|---|---|
| Re. 24,865 | 9/1960 | Juda et al. | 136—146 XR |
| 2,851,510 | 9/1958 | Pauli | 136—153 XR |
| 2,933,547 | 4/1960 | Grubb | 136—153 XR |
| 3,051,597 | 8/1962 | Bushong et al. | 161—184 |
| 3,245,950 | 4/1966 | Holm | 161—184 XR |
| 3,259,534 | 7/1966 | Wicker et al. | 156—330 XR |
| 3,297,608 | 1/1967 | Noshay et al. | 156—330 XR |
| 3,306,791 | 2/1967 | Nye | 156—330 XR |
| 3,370,998 | 2/1968 | Wiswell | 156—94 XR |
| 3,380,213 | 4/1968 | Hartman et al. | 156—94 XR |
| 3,388,016 | 6/1968 | Murray et al. | 156—94 |
| 3,232,859 | 2/1966 | Kilburn | 204—301 |
| 3,271,292 | 9/1966 | Kollsman | 204—301 XR |
| 3,412,006 | 11/1968 | Alexander et al. | 204—301 XR |

HAROLD ANSHER, Primary Examiner

G. W. MOXON, II, Assistant Examiner

U.S. Cl. X.R.

136—145; 156—330; 161—184; 204—301